United States Patent [19]

Takano et al.

[11] Patent Number: 5,163,477
[45] Date of Patent: Nov. 17, 1992

[54] ELECTROHYDRAULIC PROPORTIONAL CONTROL VALVE

[75] Inventors: Toshiro Takano; Sadao Nunotani; Naoki Ishizaki, all of Kawasaki, Japan

[73] Assignee: Kabushiki Kaisha Komatsu Seisakusho, Japan

[21] Appl. No.: 720,509
[22] PCT Filed: Dec. 27, 1989
[86] PCT No.: PCT/JP89/01315
§ 371 Date: Jun. 24, 1991
§ 102(e) Date: Jun. 24, 1991
[87] PCT Pub. No.: WO90/07669
PCT Pub. Date: Jul. 12, 1990

[30] Foreign Application Priority Data

Dec. 27, 1988 [JP] Japan ................ 63-167793

[51] Int. Cl.$^5$ ............................................. F15B 13/044
[52] U.S. Cl. ................... 137/625.65; 251/129.02; 251/129.08; 251/129.19
[58] Field of Search ............ 137/625.65; 251/129.02, 251/129.19, 129.08

[56] References Cited

U.S. PATENT DOCUMENTS

| 3,556,155 | 1/1971 | McWilliams . | |
|---|---|---|---|
| 4,316,599 | 2/1982 | Bouvet et al. | 251/129.08 |
| 4,548,383 | 10/1985 | Wolfges | 137/625.65 X |
| 4,579,145 | 4/1986 | Leiber et al. | 137/625.65 |
| 4,635,683 | 1/1987 | Nielsen | 137/625.65 |

FOREIGN PATENT DOCUMENTS 51-45808 12/1976 Japan .
60-160414 8/1985 Japan .

Primary Examiner—Gerald A. Michalsky
Attorney, Agent, or Firm—Ronald P. Kananen

[57] ABSTRACT

This invention relates to an electrohydraulic proportional control valve which continually provides pressurized oil into an oil path on the output side to prevent the existence of air therein and which can move a spool without any time delay when a solenoid is energized, thus improving response. The hydraulic proportional control valve includes a spool which establishes/cuts off communication between an inlet port communicating with a hydraulic pump and an outlet port on the output side, a spring disposed in such a manner as to apply to the base end of the spool such a spring force, which is in equilibrium with the oil pressure force acting on the tip of the spool so as to keep the spool at the position where the inlet port and the outlet port slightly communicate with each other, and a moving rod disposed in such a manner as to oppose the base end of the spool. The control valve further includes a solenoid, which biases the spool in a direction in which the inlet port and the outlet port communicate completely with each other.

3 Claims, 2 Drawing Sheets

ELECTROHYDRAULIC PROPORTIONAL CONTROL VALVE

FIELD OF THE INVENTION

The present invention relates to an electrohydraulic proportional or directional control valve having a solenoid to which is supplied an electric current so as to control the pressure of a pressurized oil supplied to an output side of the control valve.

DESCRIPTION OF THE PRIOR ART

In a conventional electrohydraulic proportional or directional control valve, as shown in FIG. 1, a sleeve-like element 3 is slidably mounted in a valve bore 2 formed in a valve body 1 of the control valve. In the sleeve-like element 3 are formed an inlet port 4 and a drain port 5. The sleeve-like element 3 has its front-end interior portion 3a communicated with an outlet port 6 formed in the valve body 1 of the control valve. A spool valve 7 is slidably mounted in the sleeve-like element 3. In the spool valve 7 are formed: an axial bore 8; and a radial port 9 which communicates with the axial bore 8 and is formed in a small-diameter portion 7a of the spool valve 7. A compression spring 10 is provided to spring bias the spool valve 7 into a position in which: an area defined between the sleeve-like element 3 and the small-diameter portion 7a of the spool valve 7 communicates with the drain port 5; and a moving rod 11a of a solenoid 11, which rod 11a is oppositely disposed from the spool valve 7, and abuts on a base-end surface of the spool valve 7. When an electric current is supplied to the solenoid 11 to energize the same, the solenoid 11 has the moving rod 11a thereof move leftward as viewed in FIG. 1 so that the spool valve 7 is pushed leftward by the moving rod 11a of the solenoid 11 to reach a position in which an area defined between the sleeve-like element 3 and the small-diameter portion 7a of the spool valve 7 communicates with the inlet port 4, whereby the pressurized oil supplied from a hydraulic pump P is supplied to the outlet port 6 through: the inlet port 4; the area defined between the sleeve-like element 3 and the small-diameter portion 7a of the spool valve 7; radial port 9; axial bore 8; and the front-end interior portion 3a of the sleeve-like element 3. The control valve having the above construction is well known.

In the above conventional control valve, by controlling the stroke of the moving rod 11a of the solenoid 11 through control of an amount of the electric current supplied to the solenoid 11, it is possible to increase/decrease an opening area of the inlet port 4 communicating with the area defined between the sleeve-like element 3 and the small-diameter portion 7a of the spool valve 7. Consequently, in such a conventional control valve, the pressure of the pressurized oil in the outlet port 6 may be controlled so as to be directly proportional to the amount of the electric current supplied to the solenoid 11.

However, in the conventional control valve described above, in the case where no electric current is supplied to the solenoid 11, the spool valve 5 moves into a position in which: the area defined between the sleeve-like element 3 and the small-diameter portion 7a of the spool valve 7 communicates with the drain port 5; and the outlet port 6 communicates with a reservoir 12, so that no pressure exists in the outlet port 6. In the case where air exists in an outlet-side passage of a hydraulic circuit of the control valve, such air is compressed when the solenoid 11 is energized to press its moving rod 11a against the spool valve 7 so as to have the pressure of the pressurized oil in the outlet port build up to a predetermined level. Consequently, such compression of air considerably impairs the responsiveness the control valve. In addition, in the conventional control valve having the above construction, the spool valve 7 takes too much time until the area defined between the sleeve-like element 3 and the small-diameter portion 7a of the spool valve 7 reaches a position in which the area communicates with the inlet port 4, and, therefore, in this respect, the responsiveness of the conventional control valve is further impaired.

SUMMARY OF THE INVENTION

Under such circumstances, the present invention was made. Consequently, it is an object of the present invention to provide an electrohydraulic proportional control valve which is improved in responsibility: by always pressurizing a pressurized oil supplied to an outlet-side passage of a hydraulic circuit of the control valve to prevent air from entering the outlet-side passage; and by moving a spool valve of the control valve without causing any time delay when a solenoid of the control valve is energized.

The above object of the present invention is accomplished in accordance with an aspect of the present invention by providing:

an electrohydraulic proportional control valve comprising in combination:
- a spool valve for permitting/preventing communication between: an inlet port communicating with a hydraulic pump disposed in a hydraulic circuit of the control valve; and an outlet port communicating with an outlet-side passage of the hydraulic circuit;
- a spring means for applying a spring force to a base-end surface of the spool valve so as to have the spring force balance a hydraulic force applied to a front-end surface of the spool valve so that the spool valve is held at a position in which the inlet port slightly communicates with the outlet port; and
- a solenoid provided with a moving rod oppositely disposed from the base-end surface of the spool valve, the solenoid being so energized as to move the spool valve into a position in which the inlet port completely communicates with the outlet port.

In the present invention having the above aspect, when no electric current is supplied to the solenoid of the control valve, the moving rod of the solenoid loses its pressing force against the spool valve to permit the spool valve to move, under the influence of a spring force exerted by the spring means, into a spring-force/-hydraulic-force balanced position in which the inlet port slightly communicates with the outlet port and is held at the position, so that: air is prevented from entering the outlet-side passage of the hydraulic circuit of the control valve; and the spool valve of the control valve is operated without causing any time delay whenever the solenoid of the control valve is energized, whereby the control valve of the present invention is improved in responsibility.

The above object, additional objects, additional aspects and advantages of the present invention will be clarified to those skilled in the art hereinbelow with reference to the following description and accompanying drawings illustrating a preferred embodiment of the present invention according to principles of the present invention.

DESCRIPTION OF THE PREFERRED EMBODIMENTS

Figure 1:
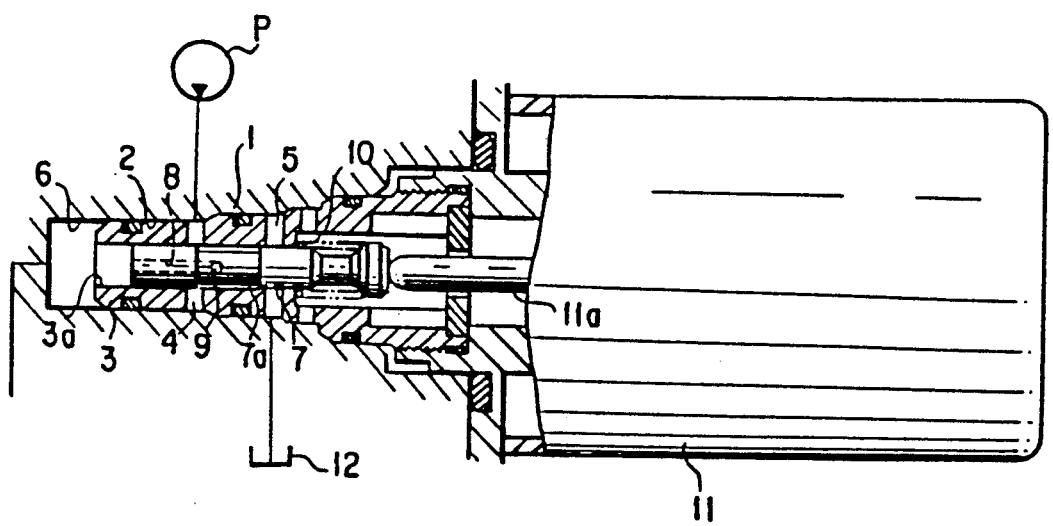
FIG. 1 is a longitudinal sectional view of a conventional proportional control valve.
Figure 2:
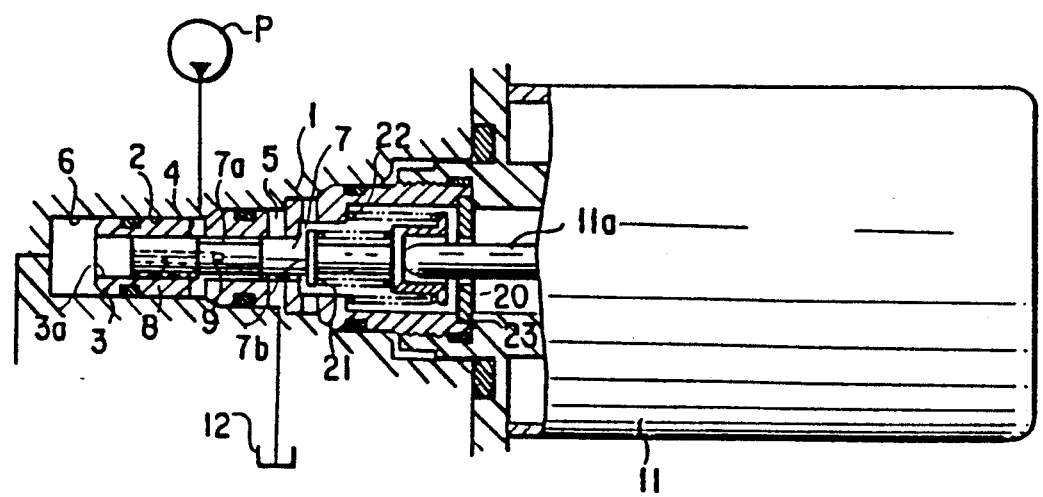
FIG. 2 is a longitudinal sectional view of a preferred embodiment of a proportional control valve of the present invention.
Figure 3:
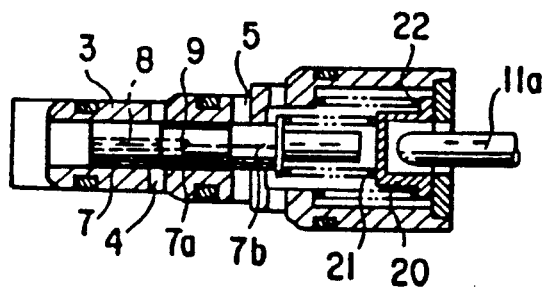
FIG. 3 is a longitudinal sectional view of the preferred embodiment of the proportional control valve of the present invention in a condition in which no electric current is supplied to the solenoid of the control valve of the present invention.
Figure 4:
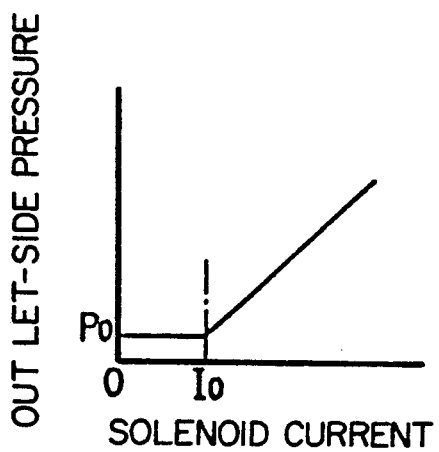
FIG. 4 is a diagram illustrating the relation between: the electric current supplied to the solenoid of the control valve of the present invention; and the pressure of the pressurized oil supplied to the outlet-side passage of the hydraulic circuit of the control valve of the present invention.

Hereinbelow, a preferred embodiment of the present invention will be described in detail with reference to the accompanying drawings (FIGS. 2 to 4). Incidentally, in FIGS. 2 to 4, the parts which are the same as ones in FIG. 1 have been given the same reference numerals and are not further explained to avoid redundancy in description.

As shown in FIG. 2, a spring shoe 20 is provided in the base-end side of the spool valve 7 so that: a first spring 21 is interposed between the spring shoe 20 and a flange portion 7b of the spool valve 7; and a second spring 22 is interposed between the spring shoe 20 and the sleeve-like element 3, whereby the spring shoe 20 abuts on a stopper 23.

Since the control valve of the present invention has the above construction, the spool valve 7 is constantly biased leftward as viewed in FIG. 2 by the first spring 21 to move into a position in which the inlet port 4 slightly communicates with the area defined between the sleeve-like element 3 and the small-diameter portion 7a of the spool valve 7. In the case where no electric current is supplied to the solenoid 11 of the control valve of the present invention, the moving rod 11a of the solenoid 11 separates from the spring shoe 20. In other words, the first spring 21 is set so that the spring force exerted by the first spring 21 to act on the base-end surface of the spool valve 7 balances the hydraulic force acting on the front-end surface of the spool valve 7 at a position in which the inlet port 4 slightly communicates with the outlet port 6 when no electric current is supplied to the solenoid 11 of the control valve.

Consequently, in the control valve of the present invention having the above construction, since the inlet port 4 slightly communicates with the outlet port 6 even when no electric current is supplied to the solenoid 11 of the control valve, it is possible to eliminate the conventional disadvantage that air enters the outlet-side passage of the hydraulic circuit of the control valve in operation.

As a result, as shown in FIG. 4, in the case where no electric current is supplied to the solenoid 11 of the control valve of the present invention, the pressure of the pressurized oil supplied to the outlet-side passage of the hydraulic circuit of the control valve has a value $P_o$. When the electric current is supplied to the solenoid 11 of the control valve of the present invention, the spring shoe 20 is pushed by the moving rod 11a of the solenoid 11. When the electric current supplied to the solenoid 11 reaches a valve $I_o$, under the influence of a pushing force of the moving rod 11a of the solenoid 11, the spring shoe 20 abuts the base-end surface of the spool valve 7, and pushes the spool valve 7 leftward as viewed in FIG. 3 until the flange portion 7b of the spool valve 7 abuts the sleeve-like element 3, so that an opening area of the inlet port 4 communicating with the area defined between the sleeve-like element 3 and the small-diameter portion 7a of the spool valve 7 is increased. As a result, the pressure of the pressurized oil supplied to the outlet-side passage of the hydraulic circuit of the control valve of the present invention increases in proportion to the electric current supplied to the solenoid 11, as shown in FIG. 4.

We claim:

1. An electrohydraulic proportional control valve comprising in combination:

a spool valve for permitting/preventing communication between an inlet port communicating with a hydraulic pump disposed in a hydraulic circuit of said control valve and an outlet port communicating with an outlet-side passage of said hydraulic circuit;

a spring means for applying a spring force to a base-end surface of said spool valve so as to have said spring force balance a hydraulic force applied to a front-end surface of said spool valve so that said spool valve is held at a position in which said inlet port partially communicates with said outlet port; and a solenoid provided with a moving rod disposed in opposition to said base-end surface of said spool valve, wherein, when said solenoid is energized to a predetermined extent, said moving rod of said solenoid exerts a force on said base-end surface of said spool valve such that said spool valve moves into a position in which said inlet port completely communicates with said outlet port.

2. The electrohydraulic proportional control valve as set forth in claim 1, wherein:

said spring means is interposed between a flange portion formed in a base-end side of a substantially intermediate large-diameter portion of said spool valve and a spring shoe movably mounted in said control valve adjacent to said moving rod of said solenoid.

3. The electrohydraulic proportional control valve as set forth in claim 2, wherein:

said spring shoe is provided with an additional spring means so as to be urged against a stopper, said stopper being provided in said control valve so as to be spaced apart from a base end of said spool valve by a predetermined distance.

* * * * *